United States Patent [19]
Kashibuchi

[11] Patent Number: 5,528,421
[45] Date of Patent: Jun. 18, 1996

[54] SIGNAL MIRROR

[75] Inventor: Hajime Kashibuchi, Hamamatsu, Japan

[73] Assignee: ASTI Corporation, Shizuoka, Japan

[21] Appl. No.: 401,248

[22] Filed: Mar. 9, 1995

[30] Foreign Application Priority Data

Apr. 25, 1994 [JP] Japan ................... 6-110544
Jul. 27, 1994 [JP] Japan ................... 6-194948

[51] Int. Cl.⁶ .................................... G02B 5/12
[52] U.S. Cl. .................... 359/515; 359/527; 359/529
[58] Field of Search .................... 359/515, 527–530, 359/537–538, 546

[56] References Cited

U.S. PATENT DOCUMENTS 2,412,616  12/1946  Hunter ................... 359/527
2,594,310  4/1952   Hunter ................... 359/527

Primary Examiner—James Phan
Attorney, Agent, or Firm—Whitham, Curtis, Whitham & McGinn

[57] ABSTRACT

A signal mirror includes an irradiation device for reflecting incident light by a same reflection function as a plane mirror and irradiating reflected light to an irradiation target; and an optical axis finding device including a sheet having at least a surface on an irradiation device side as a retroreflection face, for reflecting incident light incident on the sheet from the irradiation device side in an opposite direction to the irradiation target using retroreflection and reflection by the irradiation device, thereby ensuring finding of an optical axis of reflected light irradiated on the irradiation target by the irradiation device. The reflected light can be irradiated on the irradiation target by the irradiation device while the optical axis of the reflected light is found by the optical axis finding device.

20 Claims, 14 Drawing Sheets

SIGNAL MIRROR

BACKGROUND OF THE INVENTION

1. Field of the Invention

The present invention relates generally to a signal mirror which is used to output a distress signal to an airplane flying over or a nearby ship moving on the sea when one has met an accident for some reason during SCUBA diving and is floating in the sea. More particularly, this invention relates to a signal mirror which reflects sunlight to output a signal and is equipped with a sighting function so that the signal is easily and surely irradiated to the target.

This invention also relates to a signal mirror which has an increased field of view and can be easily designed to be compact.

2. Description of the Related Art

When one meets an accident for some reason during SCUBA diving and is floating in the sea, for example, a distress signal is output to an airplane flying over or a nearby ship moving on the sea. This type of signal may be output using a communications equipment, or the reflected light of sunlight may be irradiated as a distress signal to an airplane flying over or a ship traveling on the sea. In such a case, a reflector is normally used. This type of reflector is advantageous in that it requires no power supply and is portable.

The above conventional structure has the following shortcoming. The reflector which has been used conventionally is a simple "mirror," which has no sighting function at the time of irradiating the reflected light of the sunlight on the target, thus disabling the effective irradiation in a short period of time. The effective irradiation is difficult particularly when the irradiation target is a moving object, such as an airplane flying above or a ship traveling on a sea.

SUMMARY OF THE INVENTION

Accordingly, it is a primary object of the present invention to provide a signal mirror which can accurately find the optical axis of reflected light and surely irradiate the reflected light to a target to transmit a desired distress signal.

It is another object of this invention to provide a signal mirror which has an increased field of view and can be easily designed to be compact.

To achieve the above objects, according to this invention, there is provided a signal mirror which comprises irradiation means for reflecting incident light by a same reflection function as a plane mirror and irradiating reflected light to an irradiation target; and optical axis finding means including a sheet having at least a surface On an irradiation means side as a retroreflection face, for reflecting incident light incident on the sheet from the irradiation means side in an opposite direction to the irradiation target using retroreflection and reflection by the irradiation means, thereby ensuring the finding of an optical axis of reflected light irradiated on the irradiation target by the irradiation means.

An opening may be formed in the center portion of the sheet.

A plurality of holes may be formed in the sheet.

Further, an opening may be formed in the center portion of the sheet with a plurality of holes formed around the opening.

Furthermore, an opening may be formed in the center of the sheet, and a reflection band area may be provided around the opening with a predetermined number of holes bored in the reflection band area.

A circular opening may be formed in the center of the sheet, and a reflection band area having a predetermined shape may be provided around the opening with a plurality of holes bored in the reflection band area at predetermined pitches along the predetermined shape.

Further, a plurality of holes may be bored on the peripheral side of the reflection band area.

The predetermined shape may be a hexagonal, circular or rectangular shape.

The diameter (D1) of the circular opening may be set to 2 mm<D1<3 mm.

The width (H) of the reflection band area from the peripheral position of the opening may be set to 4.5 mm<H<5.5 mm.

Further, both sides of the sheet may be retroreflection faces so that the optical axis of reflected light is found using the retroreflection of both sides.

The optical axis finding means may be provided at two locations.

The irradiation means may have a mirror surface obtained by performing a back process on the back side of a transparent plate excluding the sheet portion.

The irradiation means may be a half mirror.

With the above structure, part of the incident light is reflected directly in the incident direction by the retroreflection face of the sheet of the optical axis finding means, and is then reflected by the same reflection function of the irradiation means as that of a plane mirror to be output as reflected light indicative of the optical axis. Another part of the incident light is reflected by the same reflection function of the irradiation means as that of a plane mirror to be irradiated on the irradiation target. Accordingly, the reflected light can be irradiated on the irradiation target surely and easily while finding the optical axis of the reflected light.

When the optical axis finding means is designed to output reflected light indicative of the optical axis using the back reflection in addition to the retroreflection face of the sheet, the amount of reflected light for finding the optical axis is increased, thus ensuring surer finding of the optical axis.

When the optical axis finding means is provided at two locations, the user can use the signal mirror as if viewing through a pair of glasses, thus improving the operability.

Further, an opening may be formed in the center portion of the retroreflection sheet with a plurality of holes formed around the opening. In this case, those holes increase the area through which the optical axis can be found, and can increase the back reflection.

Furthermore, an opening is formed in the center of the sheet, and a reflection band area is provided around the opening with a predetermined number of holes bored in the reflection band area, thus obtaining a wider field of view and a wider area for finding the optical axis of the reflected light of sunlight. This structure can also provide a sufficient amount of reflected light and a clear sight and can cope with a large incident angle. This significantly improves the performance of the signal mirror.

As an opening is formed in the center of the sheet, and a reflection band area is provided around the opening with a predetermined number of holes bored in the reflection band area, a wider field of view and a wider area for finding the optical axis of the reflected light of sunlight can be obtained. It is also possible to provide a sufficient amount of reflected light and a clear sight and cope with a large incident angle. This significantly improves the performance of the signal mirror.

Furthermore, a half mirror is used, thus considerably increasing the field of view at the time of usage, and the portion where the sheet is provided is also used as a reflection area, thus contributing to making the signal mirror compact.

DETAILED DESCRIPTION OF THE PREFERRED EMBODIMENTS

First Embodiment

Figure 1:
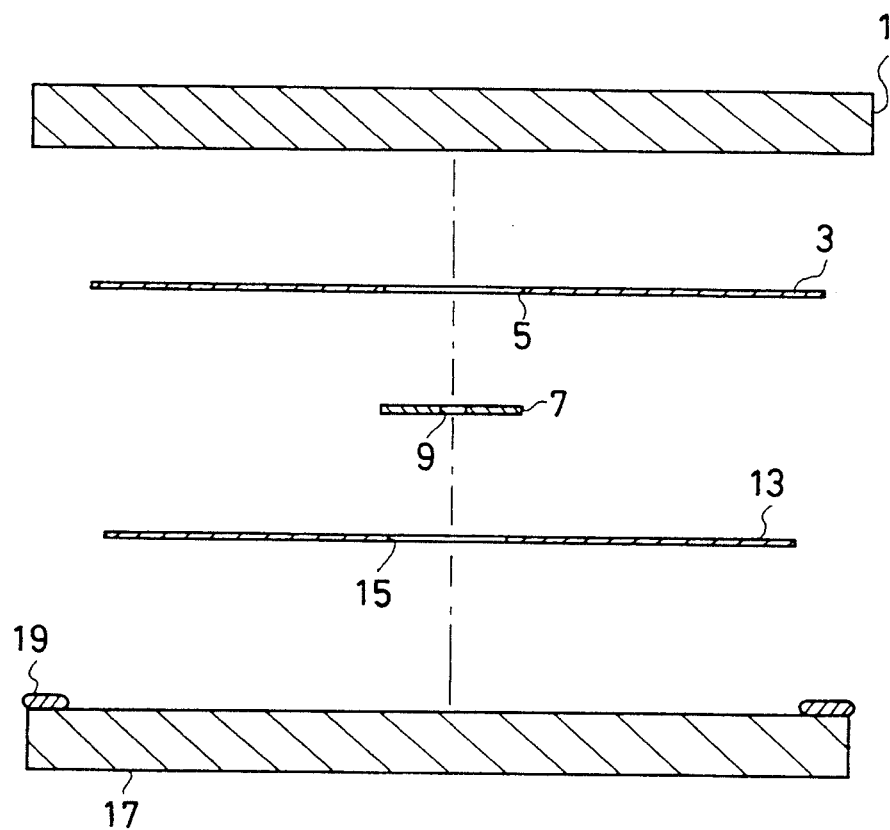
FIG. 1 is a cross-sectional view showing a signal mirror according to a first embodiment of the present invention in an exploded form.

A first embodiment of the present invention will now be described with reference to FIGS. 1 through 4. FIG. 1 is an exploded view of a signal mirror according to this embodiment. A transparent first plate 1 is formed of an acrylic plate, for example. The back of the first plate 1 (bottom in FIG. 1) is subjected to a mirroring process (e.g., aluminum deposition), and is then subjected to back printing. In FIG. 1, reference numeral "3" denotes the back-printed portion. A circular unprinted portion 5 is located in the center portion of the back-printed portion 3. This unprinted portion 5 is provided by performing an etching process (transparency process) after the back printing, for example. The back-printed portion 3 allows the back of the first plate 1, excluding the unprinted portion 5, to become a reflector.

Figure 2:
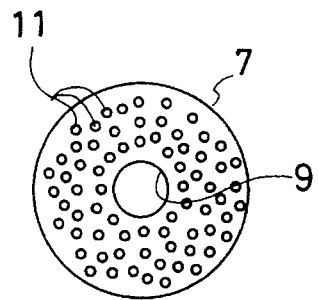
FIG. 2 is a plan view of a sheet, showing the first embodiment of this invention.

A sheet 7 is arranged on the back of the back-printed portion 3 (bottom side in FIG. 1) at the position of the unprinted portion 5. This sheet 7 has a structure as shown in FIG. 2, and is made of, for example, the same material as used for a retroreflection sheet used for traffic signs or the like (e.g., a reflection tape using glass beads, microprism or the like). This type of retroreflection sheet has a characteristic (retroreflection characteristic) which reflects reflected light of incident light directly in the incident direction. More specifically, a plurality of spherical projections, such as glass beads, are provided on the surface of the sheet, and utilizes the characteristic of spheres that reflect light directly in the incident direction. Both sides of the sheet 7 in this embodiment have similar retroreflection structures. An opening 9 is formed in the center of the sheet 7, with a plurality of holes 11 of a smaller diameter than the opening 9, bored around the opening 9.

A waterproof double-side tape 13 is adhered to the back side of the sheet 7 (bottom side in FIG. 1). This waterproof double-side tape 13 serves to provide the waterproof as apparent from the term, and to adjust the thickness of the sheet 7. An opening 15 is formed also in the center portion of the waterproof double-side tape 13. A transparent second plate 17 is located on the back side of the waterproof double-side tape 13 (bottom side in FIG. 1), and is adhered to the back of the aforementioned first plate 1 by an adhesive 19. This permits the entire parts to be integrated in a firmly secured fashion. The second plate 17 is made of the same material as the first plate 1.

Figure 3:
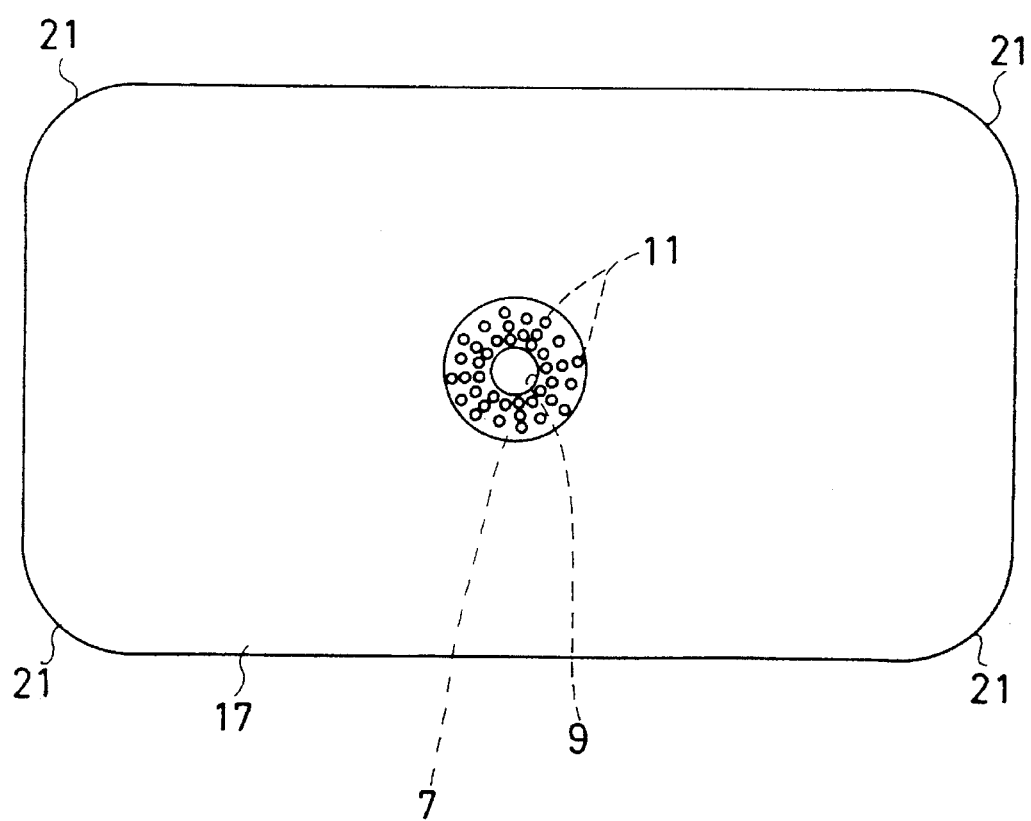
FIG. 3 is a plan view of a completed signal mirror according to the first embodiment of this invention.

The first plate 1 and the second plate 17 have a thickness of 3 mm, and have arcuate corners as shown in FIG. 3. In FIG. 3, "21" denotes the arcuate corners. The adhesive 19 is a polymerization adhesive or the like which fits well with the aforementioned first plate 1 and second plate 17. The print thickness of the back-printed portion 3 is about 10 μm.

The action and effect of the above-described structure will now be described. First, in using this signal mirror, the reflected light of sunlight is irradiated to the irradiation target while finding the optical axis of the reflected light of the sunlight through the center transparent portion (corresponding to the position of the opening 9 in the sheet 7) as shown in FIG. 3. At this time, if the irradiation target is a moving object, while irradiating the reflected light of sunlight on the irradiation target with the optical axis of the reflected light of the sunlight found all the time, the entire signal mirror should be moved to direct the reflected light of the sunlight on the irradiation target. That is, the signal mirror is a reflector with a sight function.

Figure 4:
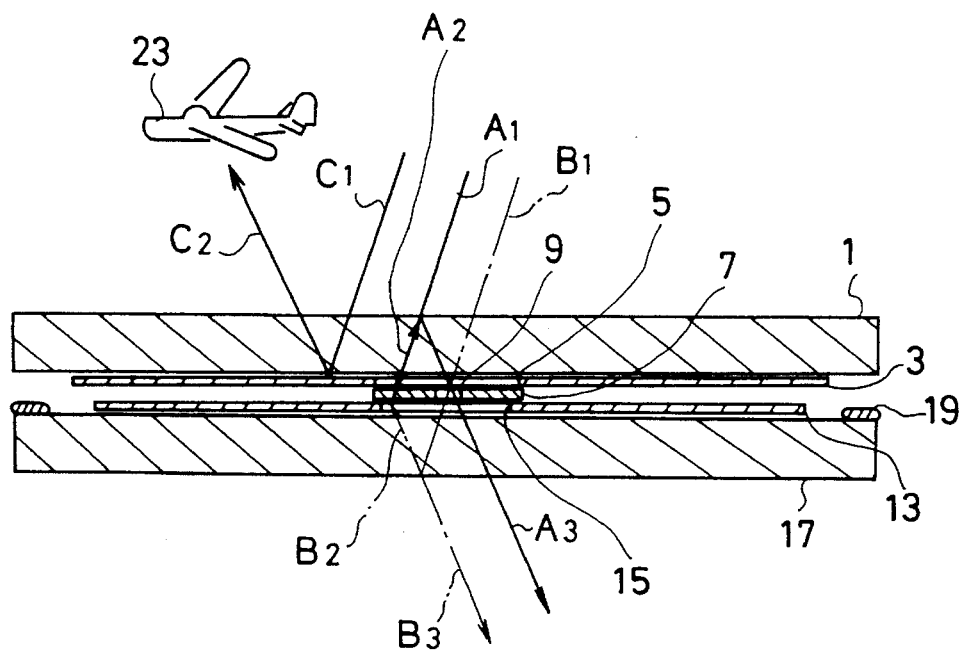
FIG. 4 is a cross-sectional view illustrating the mechanism of the signal mirror according to the first embodiment of this invention.

The finding of the optical axis of the reflected light of sunlight and the mechanism of irradiating the reflected light will be described below with reference to FIG. 4. Although FIG. 4 shows gaps between the individual constituent elements to clarify the description, those elements are actually firmly secured as mentioned above. FIG. 4 shows an airplane 23 flying above as one example of the irradiation target. First, incident light A1 of sunlight, entering the peripheral portion of the opening 9 of the sheet 7, is reflected directly in the incident direction as reflected light A2 due to the retroreflection characteristic of the surface of the sheet 7 (top face in FIG. 4), is reflected at the surface of the first plate 1 (top face in FIG. 4) by the normal reflection as caused by a plane mirror (the incident angle being the same as the reflection angle), and is then reflected as reflected light A3 toward the user through the opening 9 of the sheet 7. This reflected light A3 is found as a light spot, which indicates the optical axis of the reflected light of sunlight. In addition, the optical axis of the reflected light of sunlight may also be found by using the retroreflection at the back of the sheet 7.

Incident light B1 entering through the opening 9 of the sheet 7 is reflected by the normal reflection at the back of the second plate 17 (bottom side in FIG. 4), and enters the back of the sheet 7 as reflected light B2. As the reflected light is also reflected directly in the incident direction due to the retroreflection characteristic, the reflected light is reflected toward the user as reflected light B3. This reflected light B3 also indicates the optical axis of the reflected light of sunlight. Actually, the reflected lights A3 and B3 become merged and are found as a single light spot, thereby allowing the user to surely find the optical axis of the reflected light of sunlight.

The reflected light actually irradiated on the airplane 23 is the reflected light, C2, of incident light C1. The aforementioned reflected lights A3 and B3 and this reflected light C2 are all parallel beams, so that if the signal mirror is moved (to track the airplane 23) while finding the optical axis of the reflected light of sunlight by means of the reflected lights A3 and B3 and directing the optical axis to the airplane 23, the reflected light C2 can surely and easily be directed on the airplane 23.

As a plurality of holes 11 are bored around the opening 9 of the sheet 7 to provide a certain degree of view, the user can find the optical axis of the reflected light of sunlight by seeing it through those holes 11 even if the light spot indicative of the optical axis of the reflected light of sunlight misses the opening 9. That is, the area of the finding of the optical axis of the reflected light of sunlight is increased accordingly. The provision of the holes 11 progresses the above-described retroreflection at the back of the sheet 7. In addition to the retroreflection of the incident light B1, coming through the opening 9, at the back of the sheet 7, which has already been discussed earlier, there is the retroreflection of the incident light coming through the holes 11 at the back of the sheet 7, thus ensuring surer finding of the optical axis of the reflected light of sunlight.

Since this signal mirror requires no power supply or the like and is very portable, it is convenient to bring along in SCUBA diving. As already explained, this signal mirror can irradiate the reflected light of sunlight easily and surely to a moving object, such as an airplane or a ship.

Second Embodiment

Figure 5:
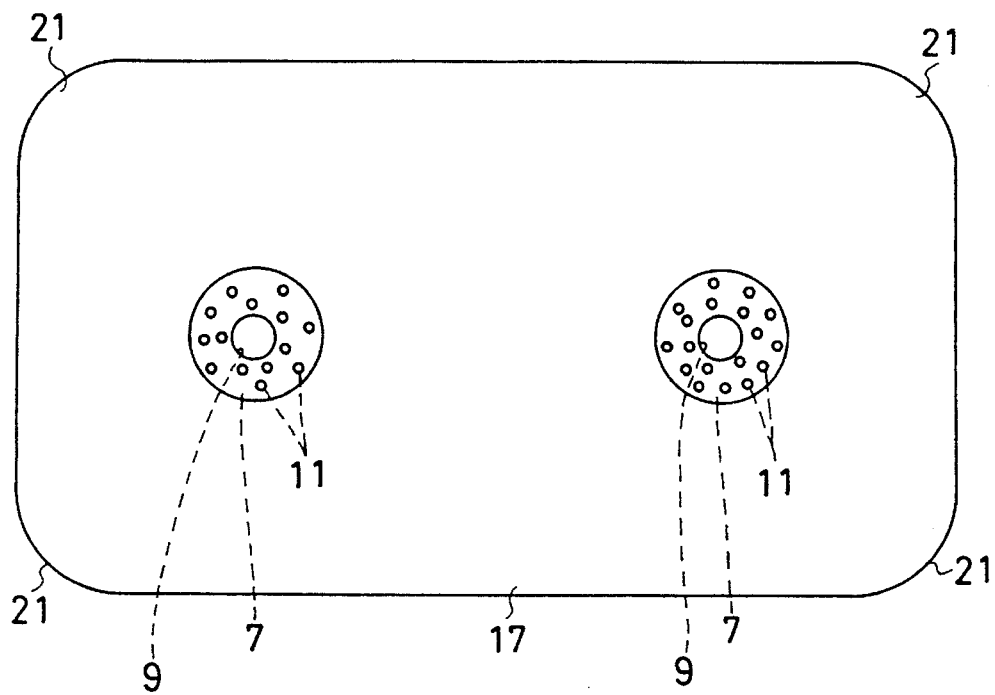
FIG. 5 is a plan view of a signal mirror according to a second embodiment of this invention.
Figure 6:
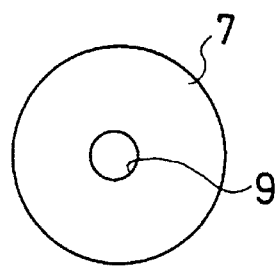
FIG. 6 is a plan view of a sheet, showing a third embodiment of this invention.

A second embodiment of this invention will be described below with reference to FIG. 5. In the first embodiment, one optical axis finding means is formed at one location in the signal mirror. If two optical axis finding means are provided as shown in FIG. 5, however, the user can use the signal mirror as if viewing through a pair of glasses. This improves the operability of the signal mirror and provides a more reliable performance. The sheet 7, if colored, can color the light spot for finding the optical axis of the reflected light of sunlight to an arbitrary color. For example, if the sheet 7 is in red, the optical axis of the reflected light of sunlight can be clearly found as a red light spot.

Third to Seventh Embodiments

The sheet 7 may have structures as shown in FIGS. 6 through 10. According to a third embodiment shown in FIG. 6, the sheet 7 has only the opening 9 formed in the center portion and has no holes 11 as provided in the first embodiment.

Figure 7:
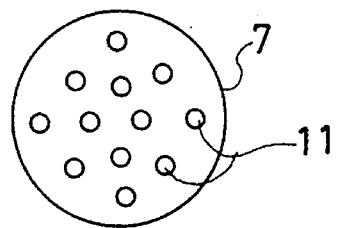
FIG. 7 is a plan view of a sheet, showing a fourth embodiment of this invention.

The sheet 7 according to a fourth embodiment shown in FIG. 7 has only a plurality of holes 11 bored therein.

Figure 8:
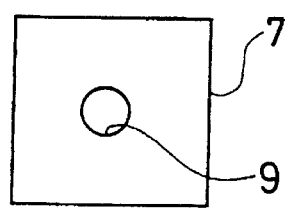
FIG. 8 is a plan view of a sheet, showing a fifth embodiment of this invention.

The sheet 7 according to a fifth embodiment shown in FIG. 8 has a rectangular shape with the opening 9 formed in the center portion.

Figure 9:
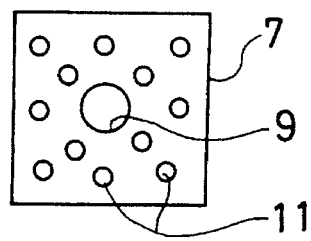
FIG. 9 is a plan view of a sheet, showing a sixth embodiment of this invention.

The sheet 7 according to a sixth embodiment shown in FIG. 9 has a rectangular shape and the opening 9 formed in the center portion with a plurality of holes 11 bored around the opening 9.

Figure 10:
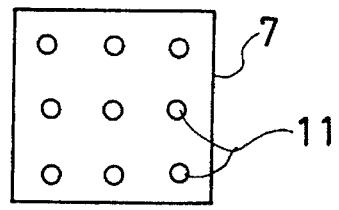
FIG. 10 is a plan view of a sheet, showing a seventh embodiment of this invention.

The sheet 7 according to a seventh embodiment shown in FIG. 10 has a rectangular shape with a plurality of holes bored therein.

The structures of the third to seventh embodiments can achieve the above-described objects. The signal mirror should have at least the opening 9 or a plurality of holes 11, and the shape of the sheet 7 is not limited to a particular shape.

Eighth Embodiment

Figure 11:
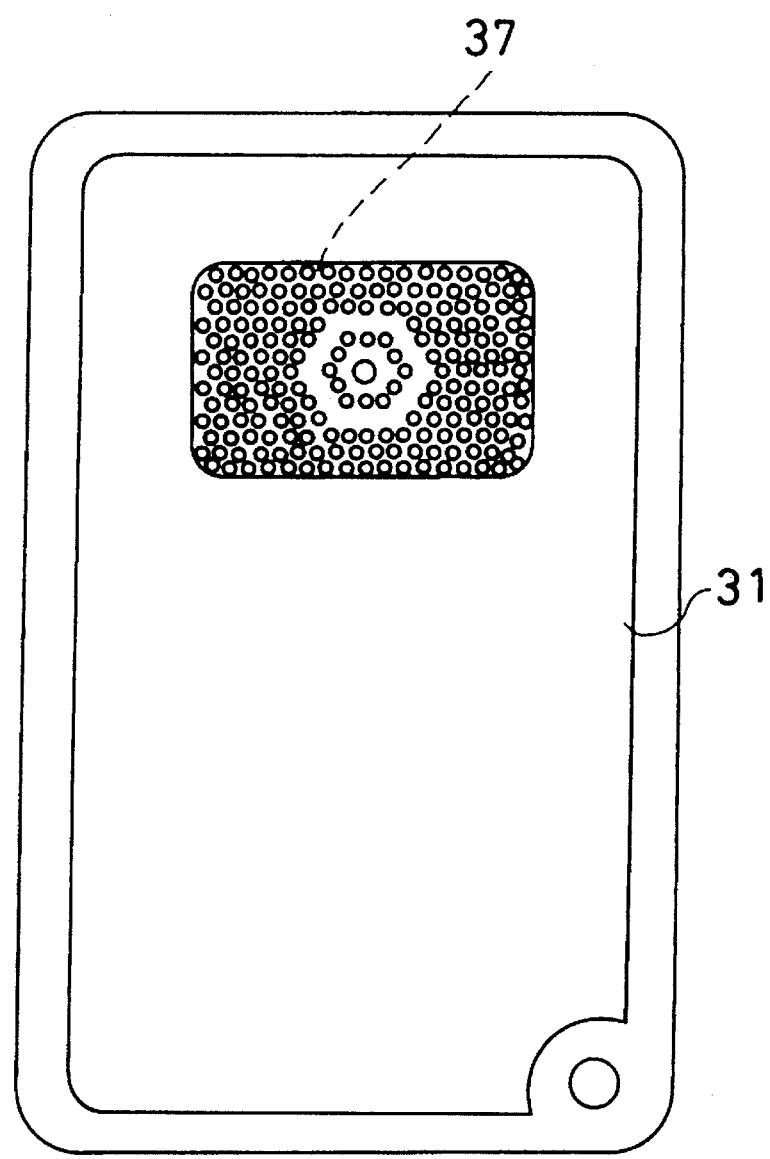
FIG. 11 is a front view of a signal mirror according to an eighth embodiment of this invention.
Figure 12:
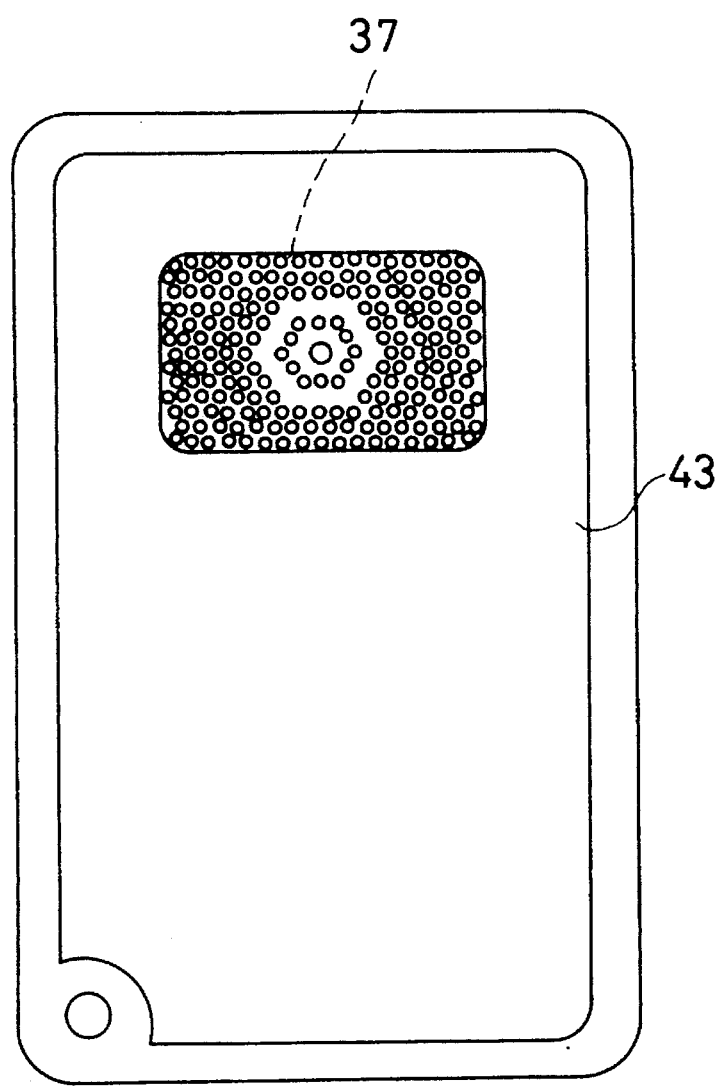
FIG. 12 is a back view of the signal mirror according to the eighth embodiment of this invention.

An eighth embodiment of this invention will be described below. FIG. 11 is a front view of a signal mirror according to this embodiment, FIG. 12 is a back view of the same, and FIG. 13 is an exploded view of the same.

A transparent first plate 31 is formed of an acrylic plate, for example. The back of the first plate 31 (bottom side in FIG. 13) is subjected to a mirroring process (e.g., aluminum deposition), and is then subjected to back printing. In FIG. 13, reference numeral "33" denotes the back-printed portion. A rectangular unprinted portion 35 is located closer to the left-hand side of the back-printed portion 33 in FIG. 13. This unprinted portion 35 is provided by performing an etching process (transparency process) after the back printing, for example. The back-printed portion 33 allows the back of the first plate 31, excluding the unprinted portion 35, to become a reflector.

A sheet 37 is arranged on the back of the back-printed portion 33 (bottom side in FIG. 13) at the position of the unprinted portion 35. This sheet 37 has a structure as shown in FIG. 14, and is made of, for example, the same material as used for a retroreflection sheet used for traffic signs or the like (e.g., a reflection tape using glass beads, microprism or the like). This type of retroreflection sheet has a characteristic (retroreflection characteristic) which reflects reflected light of incident light directly in the incident direction. More specifically, a plurality of spherical projections, such as glass beads, are provided on the surface of the sheet, and utilizes the characteristic of spheres that reflect light directly in the incident direction. Both sides of the sheet 37 in this embodiment have same retroreflection structures. The detail description of the structure of the sheet 37 will be given later.

Figure 13:
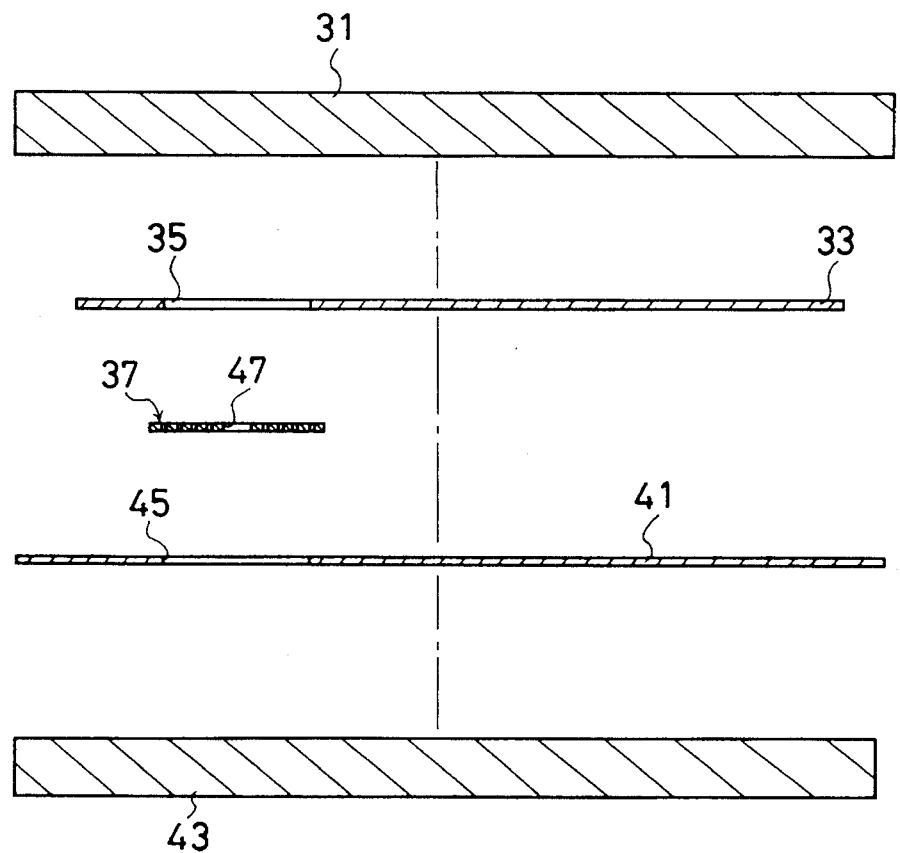
FIG. 13 is a cross-sectional view showing the signal mirror according to the eighth embodiment of this invention in an exploded form.
Figure 14:
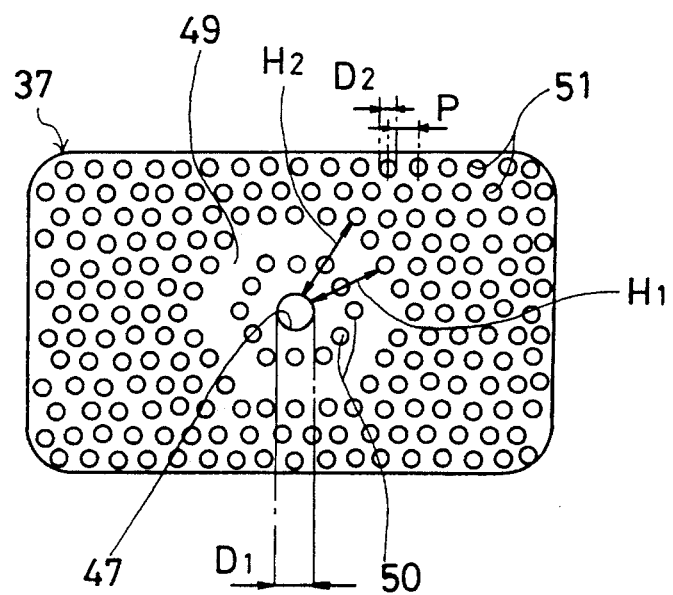
FIG. 14 is a plan view showing the structure of a sheet in the eighth embodiment of this invention.

A waterproof double-side tape 41 is adhered to the back side of the sheet 37 (bottom side in FIG. 13). This waterproof double-side tape 41 serves to provide the waterproof as apparent from the term, and to adjust the thickness of the sheet 37. The first plate 31, the sheet 37 and a second plate 43 are integrated by this waterproof double-side tape 41. The second plate 43 is made of an acrylic plate, the same material as the first plate 31. An opening 45 is formed in the waterproof double-side tape 41 at the same position as the unprinted portion 35.

The first plate 31 and the second plate 43 have a thickness of, for example, 3 mm, and have arcuate corners as shown in FIGS. 11 and 12. The print thickness of the back-printed portion 33 is about 10 µm, for example.

The structure of the sheet 37 will be described in detail below. As shown in enlargement in FIG. 14, a circular opening 47 is formed in the center of the sheet 37 to surely find the sight light even when the incident angle is relatively large. A reflection band area 49 is provided at the peripheral side of the opening 47, and has a hexagonal shape. The reason for the provision of this reflection band area 49 is to provide a sufficient reflection surface to obtain a sufficient amount of reflected light. A plurality of hole 50 smaller in diameter than the opening 47 are bored in the reflection band area 49 at the position closer to the opening 47. Those holes 50 are also arranged in a line in a hexagonal shape. The reason for the provision of the holes 50 is that the provision of the reflection band area 49 is likely to narrow the field of view for finding the optical axis but the holes 50, provided at predetermined locations, can widen the narrowed view field without obstructing the purpose of providing the reflection band area 49. A plurality of holes 51 having the same diameter as the holes 50 are also bored outside the reflection band area 49.

In this embodiment, the diameter D1 of the opening 47 is 2.5 mm, and the diameter D2 of the holes 50 and 51 is 1.0 mm. The pitch P of the holes 51 is 1.8 mm. The width H of the reflection band area 49 from the peripheral position of the opening 47 is 4.8 mm.

Figure 20:
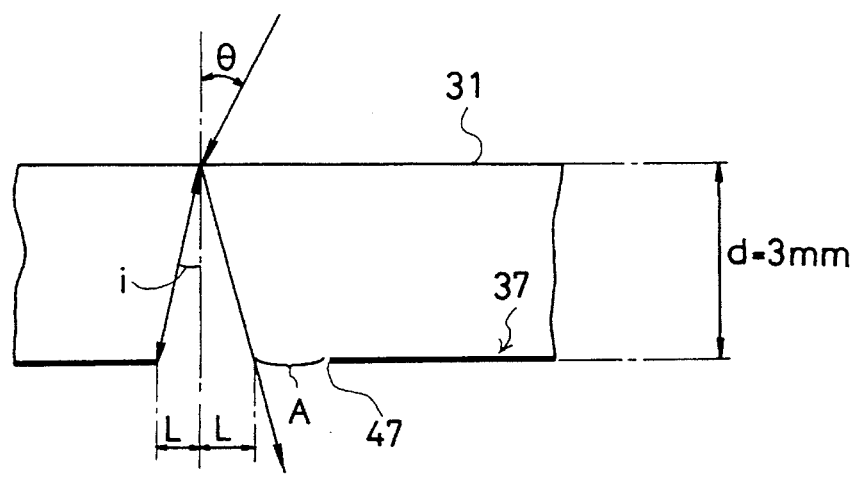
FIG. 20 is a diagram for explaining the size of an opening according to the eighth embodiment of this invention.

The background of setting the diameter D1 of the opening 47 to the aforementioned value will be discussed below. Referring to FIG. 20, the light on an incident angle of $\theta$ travels in the first plate (acrylic plate) 31 with a thickness d, refracted at an angle i due to the refractive index (n=1.49). The light retroreflected by the sheet 37 at the end of the opening 47 is reflected at the surface of the first plate 31, and then passes the opening 47 at the position apart by the distance of 2L. The distance L is calculated from the following equations (I) and (II).

$$L = d \cdot \tan(i) \qquad (I)$$

$$\sin(\theta) = n \cdot \sin(i) \qquad (II)$$

Figure 21:
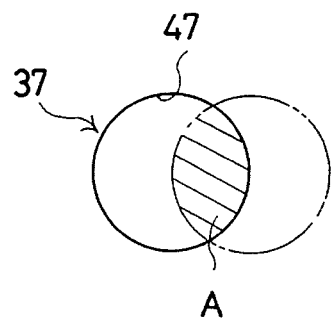
FIG. 21 is a diagram showing an area where irradiation light cannot be found and showing the eighth embodiment of this invention.

In other words, there is no sight light in the portion A in FIG. 20. This is illustrated in FIG. 21.

The smaller the incident angle $\theta$ becomes, the greater the area A where no sight light exists becomes. When the incident angle $\theta$ is small, there is a sufficient amount of sight light, so that when the area A where no sight light exists is equal to or smaller than a half the opening 47, the disappearance of the sight light does not raise a practical problem. That is, the radius r of the opening 47 should take a value satisfying r≦2L.

If the minimum incident angle $\theta$ that permits the sighting through the opening 47 is 20 degrees, L takes the following value from the aforementioned equations (I) and (II).

$$\sin 20° = 1.49 \cdot \sin(i)$$

$$i = 13.2°$$

$$L = 3 \cdot \tan 13.3°$$

$$L = 0.7$$

Thus, r becomes 2×L=1.4. That is, the diameter D1 of the opening 47 is 2.8 or smaller.

At this time, the incident angle $\theta$ when the holes 51 formed around the reflection band area 49 meet the above condition is 7.1°, and the sight function as a while is working sufficiently.

Figure 22:
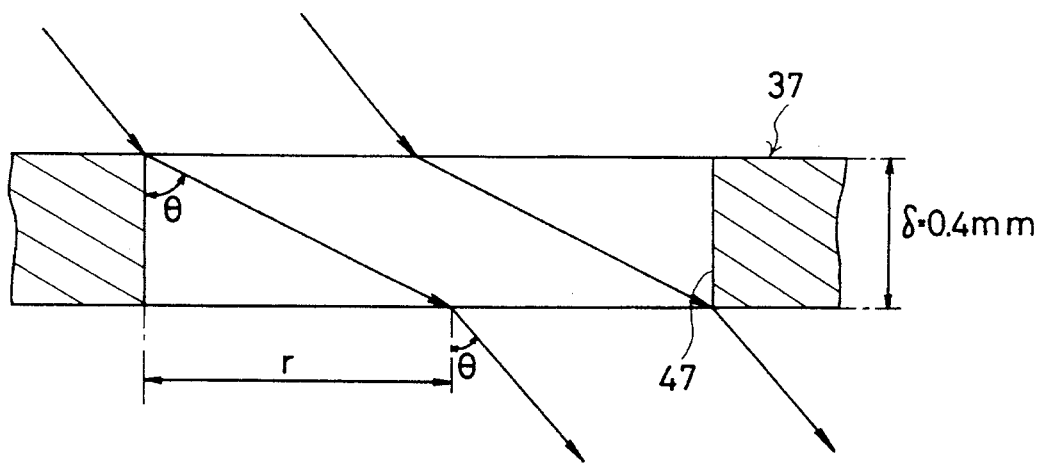
FIG. 22 is a diagram for explaining the size of the opening according to the eighth embodiment of this invention.

The minimum diameter of the opening 47 will now be discussed. As shown in FIG. 22, since the opening 47 is an air layer, light travels at the same angle $\theta$ as the incident angle $\theta$ and is shifted by the distance r when reaching the second plate 43. At this time, for the user to have the sight and see the target at the incident angle $\theta$ of 70 degrees, the opening 47 should have the size to pass more than a half amount of light. Given that the sheet 37 has a thickness $\delta$ of 0.4 mm, r=1.1 (2r=2.2) from r=$\delta \cdot \tan 70°$. That is, the diameter D1 of the opening 47 should be as low as 2.2 mm. This is the minimum diameter of the opening 47. From the above, the diameter D1 of the opening 47 should satisfy the following equation (III).

$$2.2 \leq D1 \leq 2.8 \qquad (III)$$

From this equation (III), it is preferable that the diameter D1 of the opening 47 be set almost within the range given by the following equation.

$$2 \text{ mm} \leq D1 \leq 3 \text{ mm} \qquad (III')$$

In view of the above, the diameter D1 of the opening 47 is set to 2.5 mm in this embodiment.

As the diameter D1 of the opening 47 is set to 2.5 mm in this embodiment, an excellent field of view can be obtained while the incident angle $\theta$ lies within the range of 17.7 to 72.3 degrees.

The width H of the reflection band area 49 will be described below. The reflection band area 49 is intentionally provided in this embodiment to increase the amount of reflected light, thereby increasing the amount of sight light which can be found through the opening 47. Satisfactory results could obtained over the range of 17.7°≦$\theta$≦72.3°.

Figure 23:
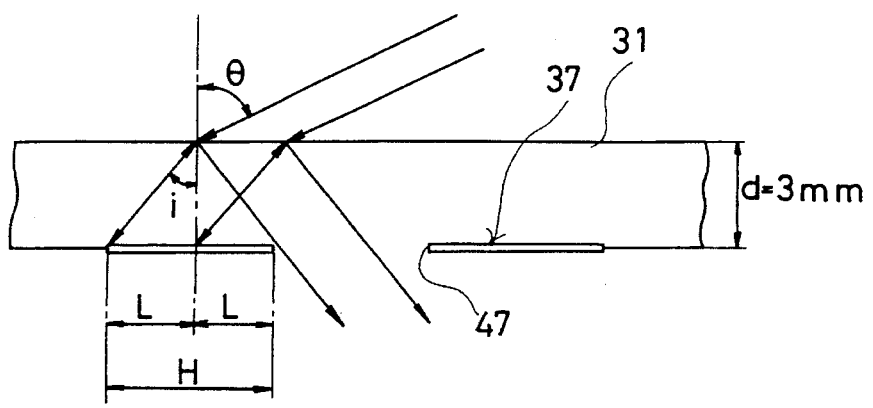
FIG. 23 is a diagram for explaining the width of a reflection band area according to the eighth embodiment of this invention.

The issue in this case is how large the width H of the reflection band area 49 should be set. For the reflection band area 49 to effectively function when the incident angle $\theta$ is 70 degrees in FIG. 23, the sight light at the end of the reflection band area 49 should pass the opening 47 in FIG. 23. From the equations (I) and (II), L in FIG. 23 can be calculated as follows.

$$\sin 70° = 1.49 = \sin(i)$$

$$L = d \cdot \tan(i) = 3 \cdot \tan(i)$$

Thus, L becomes 2.4 and the width H of the reflection band area 49 is 4.8 mm. The width, 4.8 mm, is large enough for the size of the pupils in daytime and may block the field of view. In this respect, a line of holes 50 are arranged there as described earlier. The width H of the reflection band area 49 should be set within the range of 4.5 mm=H=5.5 mm.

In this embodiment, as shown in FIG. 14, the width H2 of the reflection band area 49 to the farthest point from the end of the opening 47 is 5.5 mm and the width H1 of the reflection band area 49 to the nearest point from the end of the opening 47 is 4.5 mm.

Figure 15:
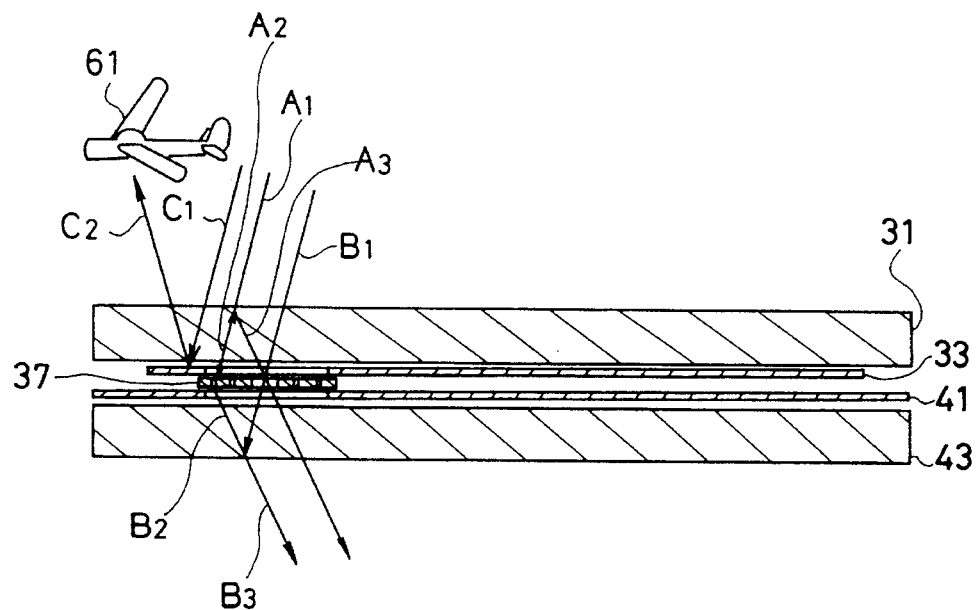
FIG. 15 is a diagram for explaining the action of the eighth embodiment of this invention.

The action and effect of the above-described structure will now be described. First, as shown in FIG. 15, in using this signal mirror, the reflected light of sunlight is irradiated to the irradiation target while finding the optical axis of the reflected light of the sunlight through the opening 47 in the sheet 37. At this time, if the irradiation target is a moving object, while irradiating the reflected light of sunlight on the irradiation target with the optical axis of the reflected light of the sunlight found all the time, the entire signal mirror should be moved. Accordingly, the reflected light of the sunlight is irradiated on the irradiation target. That is, the signal mirror is a reflector with a sight function.

The detailed description will follow.

Although FIG. 15 shows gaps between the individual constituent elements to clarify the description, those elements are actually firmly secured. In the following description, an airplane 61 flying above is described as one example of the irradiation target.

First, incident light A1 of sunlight, which enters the reflection band area 49 around the opening 47 of the sheet 37, is reflected directly in the incident direction as reflected light A2 due to the retroreflection characteristic of the surface of the sheet 37, is reflected at the surface of the first plate 31 by the normal reflection as caused by a plane mirror (the incident angle being the same as the reflection angle), and is then reflected as reflected light A3 toward the user through the opening 47 of the sheet 37. This reflected light A3 is found as a light spot, which means the optical axis of the reflected light of sunlight.

In addition to this finding, the optical axis of the reflected light of sunlight may also be found by using the retroreflection at the back of the sheet 37. Incident light B1 entering through the opening 47 of the sheet 37 is reflected by the normal reflection at the back of the second plate 43, and enters the reflection band area 49 at the back of the sheet 37 as reflected light B2. As the reflected light is also reflected directly in the incident direction due to the retroreflection characteristic, the reflected light is reflected toward the user as reflected light B3. This reflected light B3 also indicates the optical axis of the reflected light of sunlight. Actually, the reflected lights A3 and B3 become merged and are found as a single light spot, thereby allowing the user to surely find the optical axis of the reflected light of sunlight.

The reflected light actually irradiated on the airplane 61 is the reflected light, C2, of incident light C1. The aforementioned reflected lights A3 and B3 and this reflected light C2 are all parallel beams, so that if the signal mirror is moved while finding the optical axis of the reflected light of sunlight by means of the reflected lights A3 and B3 and directing the optical axis to the airplane 61, the reflected light C2 can surely and easily be directed on the airplane 61.

As the holes 50 are formed around the opening 49 of the sheet 37 in a hexagonal form to provide a certain degree of view around the opening 47, the user can easily find the optical axis of the reflected light of sunlight by seeing it through those holes 50 even if the light spot indicative of the optical axis of the reflected light of sunlight misses the opening 47. That is, the area of the finding of the optical axis of the reflected light of sunlight is sufficiently obtained. There is also the optical axis finding function using the back reflection through the holes 50. This is based on the same mechanism as the already-described mechanism of the back reflection of light entering through the opening 47. This function together with the already-described function of finding the optical axis of the reflected light of sunlight can ensure more precise finding of the optical axis of the reflected light of sunlight.

In addition, the holes 51 provided outside the reflection band area 49 exhibit the same performance as the holes 50. In other words, the area for finding the optical axis of the reflected light of sunlight is sufficiently obtained, and the back reflection through the holes 51 provides the optical axis finding function, thus ensuring surer finding of the optical axis of the reflected light of sunlight. Of course, those holes 51 can provide a sufficient field of view.

Figure 17:
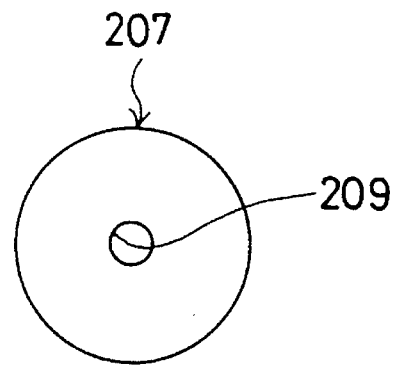
FIG. 17 is a plan view of a sheet, showing a comparative example 1.
Figure 18:
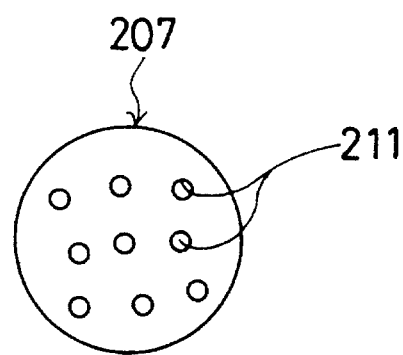
FIG. 18 is a plan view of a sheet, showing a comparative example 2.
Figure 19:
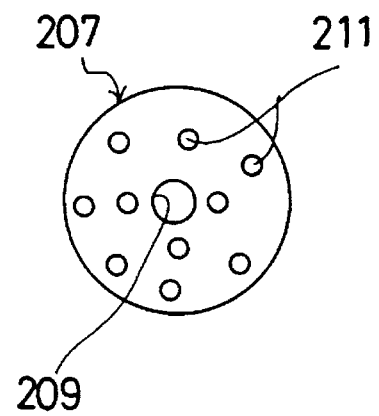
FIG. 19 is a plan view of a sheet, showing a comparative example 3.

The action and advantage of the sheet 37 will be further inspected. The sheet can take the structures as shown in FIGS. 17 through 19 in addition to the structure of this embodiment. Sheets 207 shown in FIGS. 17 through 19 will be described as comparative examples for the sheet 37 of this embodiment to clarify the differences. The sheet 207 shown in FIG. 17 (comparative example 1) has an opening 209 bored in the center. The sheet 207 shown in FIG. 18 (comparative example 2) has a plurality of holes 211 smaller in diameter than the opening 209. The sheet 207 shown in FIG. 19 (comparative example 3) has an opening 209 and a plurality of holes 211. Those comparative examples 1 through 3 will now be compared with the sheet 37 of this embodiment.

To begin with, let us consider which one is easier to find a moving object (irradiation target). As the comparative example 1 shown in FIG. 17 has simply the opening 209 formed in the center, the field of view is narrower and it is difficult to track the moving object. As the comparative examples 2 and 3 have a plurality of holes 211, providing a wider field of view, it is easy to track the moving object. The sheet 37 of this embodiment has a plurality of holes 50 arranged in a hexagonal form which correspond to the holes 211 of the comparative examples 2 and 3, and also has a plurality of holes 51. Although the sheet 37 has a slightly poorer field of view by fewer holes than those of the comparative examples 2 and 3, it is sufficient to find and track a moving object.

With regard to the area for finding the optical axis, the comparative examples 2 and 3 and the sheet 37 of this embodiment have a sufficient optical axis finding area because of the same reason given above.

Regarding the amount of reflected light, the comparative example 1 has a sufficient amount of reflected light due to its wide reflection area, whereas the comparative examples 2 and 3 shown in FIGS. 18 and 19 have a narrower reflection area due to the provision of the holes 211 and cannot obtain a sufficient amount of reflected light. In this embodiment, the provision of the reflection band area 49 can ensure a sufficient amount of reflected light.

Now, let us consider whether the sight is clear. As the comparative example 1 shown in FIG. 17 has the opening 209 in the center, light concentrates and passes there, thus ensuring a clear sight. As the comparative example 2 shown in FIG. 18 does not have such an opening, the sight is not clear. Although the comparative example 3 shown in FIG. 19 provides a relatively clear sight due to the opening 209, the sight is slightly impaired by the influence of the holes 211. In this embodiment, the opening 47 provides a clear sight and a relatively small number of holes 50 are provided so that the holes 50 do not affect the sight so much unlike the comparative example 3 in FIG. 19.

Figure 16:
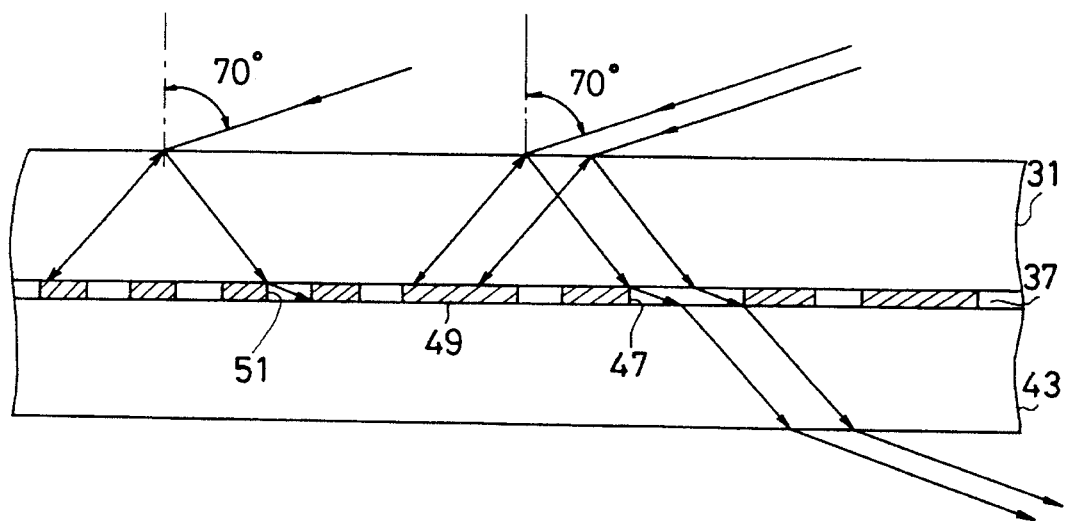
FIG. 16 is a diagram for explaining the action of the eighth embodiment of this invention.

When the incident angle is large, the comparative examples 1 and 3 having the opening 209 as shown in FIGS. 17 and 19 raise no problem, whereas the comparative example 2 shown in FIG. 18 has a limited performance. In this embodiment, the provision of the opening 47 allows the user to properly cope with such a case. This will be further checked with reference to FIG. 16. FIG. 16 shows how reflected light behaves for a large incident angle of 70 degrees. First, the reflected light cannot pass the small-diameter holes 51 any more, and the optical axis of the reflected light of sunlight cannot be found through those portions. As the reflected light passes the opening 47, however, the optical axis of the reflected light of sunlight can still be found through the opening 47. That is, the provision of the relatively large opening 47 in the center permits the user to cope with a large incident angle.

In the case of the sheet 37 of this embodiment, the reflection band area 49 is provided to obtain a sufficient amount of reflected light, a plurality of holes 50 are provided to obtain a wide field of view to find a moving object and obtain a wide optical axis finding area, and the opening 47 is provided in the center to ensure a clear sight and permit the user to cope with a large incident angle. As apparent from the foregoing description of the comparison with the comparative examples 1 through 3 shown in FIGS. 17 to 19, this embodiment is very easy to use in every aspect.

The sheet 37 may be designed to have a rectangular shape or circular shape beside the hexagonal shape. In this case, the holes 50 should be arranged to match the shape of the sheet.

Ninth Embodiment

A ninth embodiment of this invention will now be described.

Figure 24:
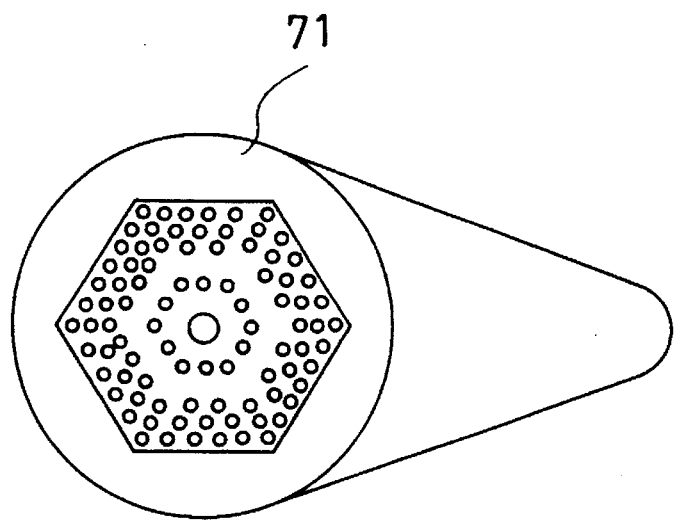
FIG. 24 is a front view of a signal mirror according to a ninth embodiment of this invention.
Figure 25:
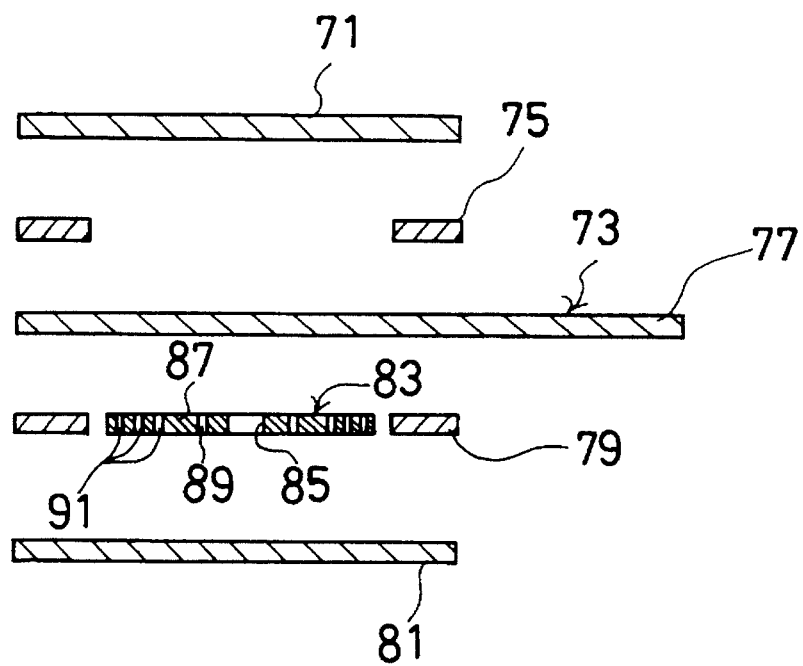
FIG. 25 is an exploded view of the signal mirror according to the ninth embodiment of this invention.

As shown in FIGS. 24 and 25, a first plate 71 which is a half mirror has a characteristic of reflecting 7% of the incident light and passing the remaining 30%. The reason for using a half mirror as the first plate 71 is to widen the field of view at the time of usage and to facilitate designing a compact signal mirror.

The transmittivity of the half mirror is not limited to the above figure, but may be set as desired.

Figure 27:
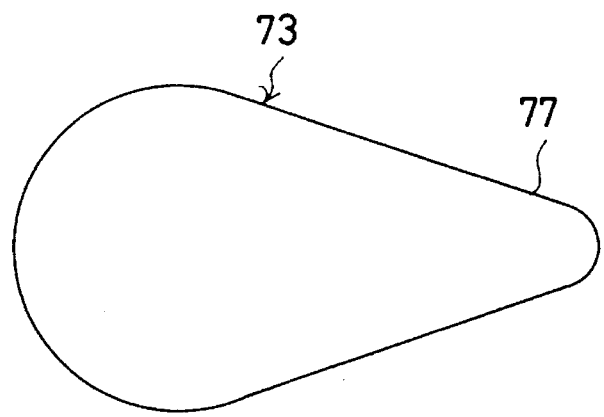
FIG. 27 is a front view showing a third plate in the ninth embodiment of this invention.

A second plate 73 made of an acrylic plate is securely adhered to the bottom of the first plate 71 in the diagram by means of a transparent double-side tape 75 having the waterproof characteristic. The second plate 73 has a shape as shown in FIG. 27 in which an extending portion on the right-hand side is a handle 77.

Figure 26:
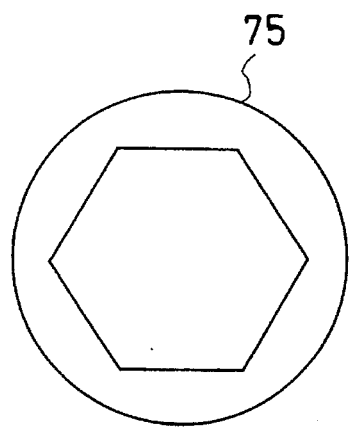
FIG. 26 is a front view showing a double-side tape in the ninth embodiment of this invention.

A transparent third plate 81 is securely adhered to the bottom of the second plate 73 in the diagram by means of a white double-side tape 79 having the waterproof characteristic. The double-side tape 75 has a shape as shown in FIG. 26 and has its center portion cut away in a hexagonal shape. The double-side tape 79 likewise has its center portion cut away in a hexagonal shape, and is made thicker than the double-side tape 75. A sheet 83 intervenes in the hexagonally cut center portion of the double-side table 79.

Figure 28:
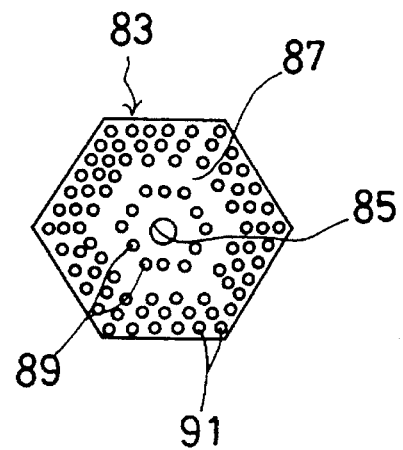
FIG. 28 is a front view of a sheet, showing the ninth embodiment of this invention.

This sheet 83 has a structure as shown in FIG. 28, and is made of, for example, the same material as used for a retroreflection sheet used for traffic signs or the like (e.g., a reflection tape using glass beads, microprism or the like). This type of retroreflection sheet has a characteristic (retroreflection characteristic) which reflects reflected light of incident light directly in the incident direction. More specifically, a plurality of spherical projections, such as glass beads, are provided on the surface of the sheet, and utilizes the characteristic of spheres that reflect light directly in the incident direction. Both sides of the sheet 83 in this embodiment have similar retroreflection structures.

The structure of the sheet 83 will be described in detail below. As shown in enlargement in FIG. 28, a circular opening 85 is formed in the center of the sheet 83 to surely find the sight light even when the incident angle is relatively large. A reflection band area 87 is provided at the peripheral side of the opening 85, and has a hexagonal shape. The reason for the provision of this reflection band area 87 is to provide a sufficient reflection surface to obtain a sufficient amount of reflected light. A plurality of hole 89 (12 holes in this embodiment) smaller in diameter than the opening 85 are bored in the reflection band area 87 at the position closer to the opening 85. Those holes 89 are also arranged in a line in a hexagonal shape. The reason for the provision of the holes 89 is that the provision of the reflection band area 87 is likely to narrow the field of view for finding the optical axis but the holes 89, provided at predetermined locations, can widen the narrowed view field without obstructing the purpose of providing the reflection band area 87. A plurality of holes 91 equal in number to the holes 89 are also bored outside the reflection band area 87.

Figure 29:
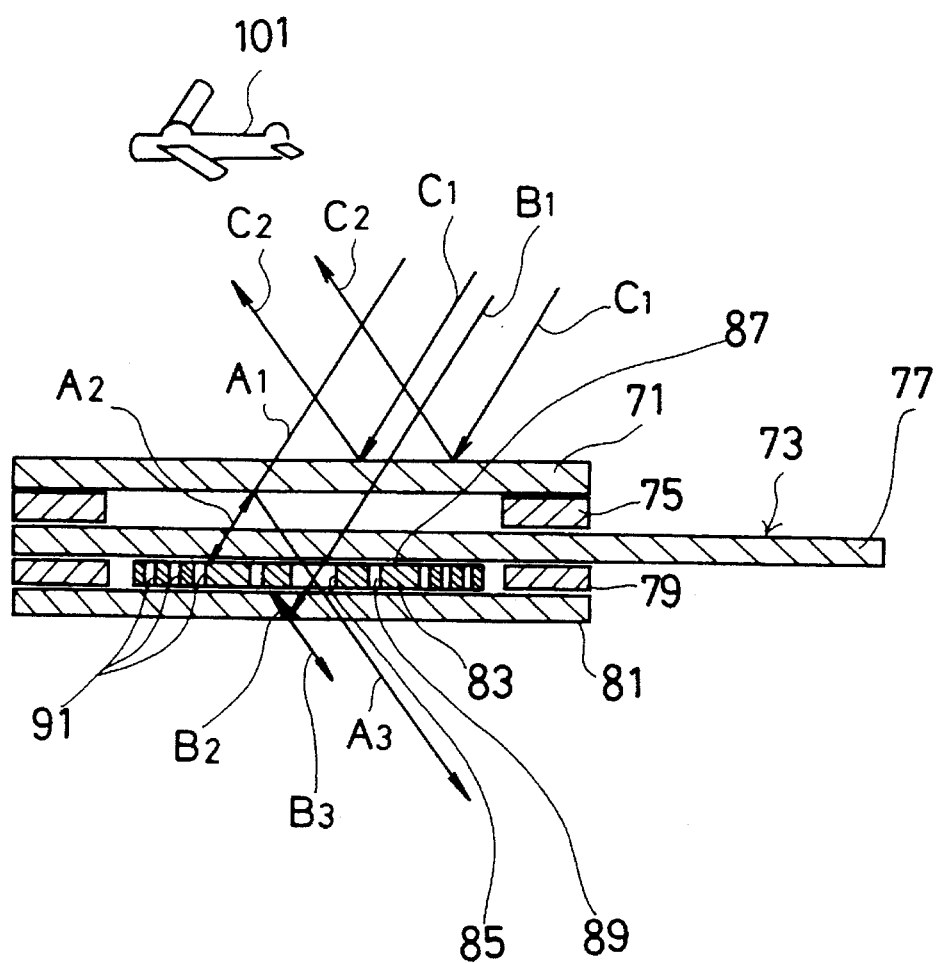
FIG. 29 is a diagram for explaining the action of the ninth embodiment of this invention.

The action and effect of the above-described structure will now be described. First, as shown in FIG. 29, in using this signal mirror, the reflected light of sunlight is irradiated to the irradiation target while finding the optical axis of the reflected light of the sunlight through the opening 85 in the sheet 83. At this time, if the irradiation target is a moving object, while irradiating the reflected light of sunlight on the irradiation target with the optical axis of the reflected light of the sunlight found all the time, the entire signal mirror should be moved. Accordingly, the reflected light of the sunlight is irradiated on the irradiation target. That is, the signal mirror is a reflector with a sight function.

The detailed description will follow.

Although FIG. 29 shows gaps between the individual constituent elements to clarify the description, those elements are actually firmly secured. In the following description, an airplane 101 flying above is described as one example of the irradiation target.

First, incident light A1 of sunlight, which passes the first plate 71 (half mirror) and enters the reflection band area 87 around the opening 85 of the sheet 83, is reflected directly in the incident direction as reflected light A2 due to the retroreflection characteristic of the surface of the sheet 83, is reflected at the surface of the first plate 71 by the normal reflection as caused by a plane mirror (the incident angle being the same as the reflection angle), and is then reflected as reflected light A3 toward the user through the opening 85 of the sheet 83. This reflected light A3 is found as a light spot, which means the optical axis of the reflected light of sunlight.

In addition to the finding by the reflection at the surface side of the sheet 83, the optical axis of the reflected light of sunlight, though quantitatively small, may also be found by using the retroreflection at the back of the sheet 83. Incident light B1 entering through the opening 85 of the sheet 83 is reflected by the normal reflection at the back of the third plate 81, and enters the reflection band area 87 at the back of the sheet 83 as reflected light B2. As the reflected light is also reflected directly in the incident direction due to the retroreflection characteristic, the reflected light is reflected toward the user as reflected light B3. This reflected light B3 also indicates the optical axis of the reflected light of sunlight. Actually, the reflected lights A3 and B3 become merged and are found as a single light spot, thereby allowing the user to surely find the optical axis of the reflected light of sunlight.

The reflected light actually irradiated on the airplane 101 is the reflected light, C2, of incident light C1. The aforementioned reflected lights A3 and B3 and this reflected light C2 are all parallel beams, so that if the signal mirror is moved while finding the optical axis of the reflected light of sunlight by means of the reflected lights A3 and B3 and directing the optical axis to the airplane 101, the reflected light C2 can surely and easily be directed on the airplane 101.

As the holes 89 are formed around the opening 85 of the sheet 83 in a hexagonal form to provide a certain degree of view around the opening 85, the user can easily find the optical axis of the reflected light of sunlight by seeing it through those holes 89 even if the light spot indicative of the optical axis of the reflected light of sunlight misses the opening 85. That is, the area of the finding of the optical axis of the reflected light of sunlight is sufficiently obtained. There is also the optical axis finding function using the back reflection, though quantitatively small, through the holes 89. This is based on the same mechanism as the already-described mechanism of the back reflection of light entering through the opening 85. This function together with the already-described function of finding the optical axis of the reflected light of sunlight can ensure more precise finding of the optical axis of the reflected light of sunlight.

In addition, the holes 91 provided outside the reflection band area 87 exhibit the same performance as the holes 89. In other words, the area for finding the optical axis of the reflected light of sunlight is sufficiently obtained, and the back reflection through the holes 91, though quantitatively small, provides the optical axis finding function, thus ensuring surer finding of the optical axis of the reflected light of sunlight. Of course, those holes 91 can provide a sufficient field of view.

The following will discuss the action and advantage of the signal mirror when the first plate 71 made of a half mirror is used. First, as the first plate 71 is a half mirror, the field of view at the time of usage can be widened. For instance, the signal mirrors of the first to eighth embodiments obtain a relatively large reflection surface around the portion where the sheet is located. If the reflection surface is accomplished by a half mirror, the user can see the irradiation direction through this portion when the signal mirror is in use, thus widening the field of view accordingly.

As the first plate 71 is a half mirror, the entire portion including the portion where the sheet 83 is located can be designed as the first plate 71. While the mirror face (aluminum deposited surface) should be removed to pass the light in the sheet portion in the signal mirrors of the first to eighth embodiments, the use of a half mirror can secure the entire area including that portion for the first plate 71. Accordingly, the portion where the sheet 83 is located can also be used as a reflection area to reflect sunlight. It is possible to provide a sufficient amount of reflected light even without obtaining a large reflection area on the peripheral side of the sheet 83, thus contributing to designing the signal mirror compact. This embodiment is the exact example of a compact signal mirror.

The provision of the first plate of a half mirror even at the portion where the sheet 83 is located does not raise any problem about the amount of light for finding the optical axis of the reflected light of sunlight for the following reason. As the light passing the first plate 71 or the light A1 shown in FIG. 29 is 30% of the entire light, it is less than the amount when no half mirror is used. With regard to the light A2 retroreflected at the sheet 83, the amount of the reflection is the same regardless of the use of the half mirror. Regarding the light reflected as the light A3, when the half mirror is used, the first plate 71 also serves as a half mirror in this case so that 70% of the light A2 is reflected as the light A3. If no half mirror is used, on the other hand, the amount of reflection is considerably smaller than the mentioned amount. As a conclusion, the amount of light for finding the optical axis of the reflected light of sunlight is greater in the case where a half mirror is used than the case where no half mirror is used. It is therefore apparent that the use of a half mirror does not impair the function of finding the optical axis of the reflected light of sunlight.

Although the reflection band area 87 on the sheet 83 in one embodiment is designed to have a hexagonal shape, it may have a rectangular shape or a circular shape. In this case, the holes 89 should be arranged in the form matching the shape of the reflection band area.

Although the illustrated examples are designed to be compact, the reflection surfaces of the signal mirrors of the first to eighth embodiments may be designed as a half mirror.

Further, the sheet 83 may be arranged all over the first plate 71 which is made of a half mirror.

What is claimed is:

1. A signal mirror comprising:

irradiation means for reflecting incident light by a same reflection function as a plane mirror and irradiating reflected light to an irradiation target; and optical axis finding means including a sheet having at least a surface on an irradiation means side as a retroreflection face, for reflecting incident light incident on said sheet from said irradiation means side in an opposite direction to said irradiation target using retroreflection and reflection by said irradiation means, thereby ensuring finding of an optical axis of reflected light irradiated on said irradiation target by said irradiation means, wherein a first optical axis finding means is provided at a first location on said irradiation means and a second optical axis finding means is provided at a second location on said irradiation means.

2. The signal mirror as claimed in claim 1, wherein an opening is formed in a center portion of said sheet.

3. The signal mirror as claimed in claim 1, wherein said irradiation means has a mirror surface obtained by performing a back process on a back side of a transparent plate, wherein said back process provides said mirror surface on all of said irradiation means outside an area corresponding to said sheet.

4. The signal mirror as claimed in claim 1, wherein said irradiation means comprises a half mirror.

5. The signal mirror as claimed in claim 1, wherein a plurality of holes are formed in said sheet.

6. The signal mirror as claimed in claim 1, wherein an opening is formed in said sheet and at least one hole is formed around said opening.

7. The signal mirror as claimed in claim 1, wherein an opening is formed in said sheet and a reflection band area is provided around said opening.

8. The signal mirror as claimed in claim 1, wherein an optical axis of reflected light is found using retroreflection on said irradiation means side and a side opposite said irradiation means side.

9. The signal mirror as claimed in claim 1, wherein said optical axis finding means has one of a hexagonal, circular and rectangular shape.

10. The signal mirror as claimed in claim 1, further comprising a plate connected to said irradiation means, wherein said plate is positioned parallel to said irradiation means and extends beyond said irradiation means to form a handle.

11. A signal mirror comprising:

irradiation means for reflecting incident light by a same reflection function as a plane mirror and irradiating reflected light to an irradiation target; and optical axis finding means including a sheet having at least a surface on an irradiation means side as a retroreflection face, for reflecting incident light incident on said sheet from said irradiation means side in an opposite direction to said irradiation target using retroreflection and reflection by said irradiation means, thereby ensuring finding of an optical axis of reflected light irradiated on said irradiation target by said irradiation means, wherein a plurality of holes are formed in said sheet.

12. A signal mirror comprising:

irradiation means for reflecting incident light by a same reflection function as a plane mirror and irradiating reflected light to an irradiation target; and optical axis finding means including a sheet having at least a surface on an irradiation means side as a retroreflection face, for reflecting incident light incident on said sheet from said irradiation means side in an opposite direction to said irradiation target using retroreflection and reflection by said irradiation means, thereby ensuring finding of an optical axis of reflected light irradiated on said irradiation target by said irradiation means, wherein an opening is formed in a center portion of said sheet and a plurality of holes are formed around said opening.

13. A signal mirror comprising:

irradiation means for reflecting incident light by a same reflection function as a plane mirror and irradiating reflected light to an irradiation target; and optical axis finding means including a sheet having at least a surface on an irradiation means side as a retroreflection face, for reflecting incident light incident on said sheet from said irradiation means side in an opposite direction to said irradiation target using retroreflection and reflection by said irradiation means, thereby ensuring finding of an optical axis of reflected light irradiated on said irradiation target by said irradiation means, wherein an opening is formed in a center of said sheet, a reflection band area is provided around said opening and a predetermined number of holes are bored in said reflection band area.

14. The signal mirror as claimed in claim 13, wherein a circular opening is formed in-said center of said sheet, a reflection band area having a predetermined shape is provided around said opening and a plurality of holes are bored in said reflection band area at predetermined pitches along said predetermined shape.

15. The signal mirror as claimed in claim 14, wherein a plurality of holes are bored on a peripheral side of said reflection band area.

16. The signal mirror as claimed in claim 14, wherein said predetermined shape is one of a hexagonal, circular and rectangular shape.

17. The signal mirror as claimed in claim 14, wherein said circular opening has a diameter (D1) of 2 mm<D1<3 mm.

18. The signal mirror as claimed in claim 14, wherein a width (H) of said reflection band area from a peripheral position of said opening is 4.5 mm<H<5.5 mm.

19. The signal mirror as claimed in claim 13, wherein a plurality of holes are bored on a peripheral side of said reflection band area.

20. A signal mirror comprising:

irradiation means for reflecting incident light by a same reflection function as a plane mirror and irradiating reflected light to an irradiation target; and optical axis finding means including a sheet having at least a surface on an irradiation means side as a retroreflection face, for reflecting incident light incident on said sheet from said irradiation means side in an opposite direction to said irradiation target using retroreflection and reflection by said irradiation means, thereby ensuring finding of an optical axis of reflected light irradiated on said irradiation target by said irradiation means, wherein both sides of said sheet comprise retroreflection faces and an optical axis of reflected light is found using retroreflection of said both sides.

* * * * *